(12) United States Patent
Harikae (10) Patent No.: US 8,505,601 B2
(45) Date of Patent: Aug. 13, 2013

(54) PNEUMATIC RADIAL TIRE

(75) Inventor: Shinya Harikae, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 394 days.

(21) Appl. No.: 11/920,666

(22) PCT Filed: May 31, 2006

(86) PCT No.: PCT/JP2006/310874
§ 371 (c)(1),
(2), (4) Date: Nov. 19, 2007

(87) PCT Pub. No.: WO2006/129708
PCT Pub. Date: Dec. 7, 2006

(65) Prior Publication Data
US 2009/0095396 A1    Apr. 16, 2009

(30) Foreign Application Priority Data
May 31, 2005    (JP) ................................. 2005-158853

(51) Int. Cl.
*B60C 9/18*    (2006.01)
*B60C 9/20*    (2006.01)
*B60C 9/22*    (2006.01)

(52) U.S. Cl.
USPC ............ 152/526; 152/531; 152/534; 152/535; 152/537; 152/538

(58) Field of Classification Search
None
See application file for complete search history.

(56) References Cited

U.S. PATENT DOCUMENTS

| | | | | |
|---|---|---|---|---|
| 4,140,166 A * | 2/1979 | Koyama et al. | ............... | 152/537 |
| 4,696,335 A * | 9/1987 | Tsukagoshi et al. | .......... | 152/535 |
| 4,702,293 A * | 10/1987 | Iwata et al. | ................... | 152/531 |
| 5,400,847 A * | 3/1995 | Suzuki et al. | ................ | 152/527 |
| 5,795,417 A * | 8/1998 | Damke et al. | ................ | 152/527 |
| 5,839,264 A * | 11/1998 | Uchio | ............ | 57/237 |
| 6,145,560 A * | 11/2000 | Yamada et al. | ............... | 152/532 |
| 6,315,019 B1 * | 11/2001 | Garlaschelli et al. | ......... | 152/527 |
| 6,367,527 B1 | 4/2002 | Cluzel | | |
| 6,460,587 B1 | 10/2002 | Herbelleau | | |
| 6,701,989 B2 * | 3/2004 | Choi et al. | ................... | 152/556 |
| 7,416,006 B2 * | 8/2008 | Maurel | ........................ | 152/526 |

FOREIGN PATENT DOCUMENTS

| | | | |
|---|---|---|---|
| DE | 4209817 | * | 3/1993 |
| EP | 422881 | * | 4/1991 |
| EP | 571204 | * | 11/1993 |
| EP | 756949 | * | 2/1997 |

(Continued)

Primary Examiner — Justin Fischer
(74) Attorney, Agent, or Firm — Greer, Burns & Crain, Ltd.

(57) ABSTRACT

Provided is a pneumatic radial tire including a main belt layer and at least one circumferential-direction reinforcement layer, which are provided in the tread portion. The main belt layer includes two belt layers in which steel cords are disposed in a manner that the steel cords of a first one of the two belt layers intersect the steel cords of a second one of the two belt layers. In the circumferential-direction reinforcement layer, steel cords are disposed in a substantial tire circumferential direction. The ratio Wo/Wm of the width Wo of the circumferential-direction reinforcement layer to the maximum width Wm of the main belt layer is 0.5 to 0.9. The ratio Ee/Ec of the reinforcement-cord elastic modulus Ee of the steel cords in the edge portions of the circumferential-direction reinforcement layer to the reinforcement-cord elastic modulus Ec of the steel cords in the center portion of the circumferential-direction reinforcement layer is not less than (0.85–0.5 Wo/Wm) and not more than 0.8.

12 Claims, 1 Drawing Sheet

(56) References Cited

FOREIGN PATENT DOCUMENTS

| | | | |
|---|---|---|---|
| GB | 2017019 | * | 9/1979 |
| JP | 2-81706 | * | 3/1990 |
| JP | 2-296507 | * | 12/1990 |
| JP | 5-139115 | * | 6/1993 |
| JP | 6-191219 | * | 7/1994 |
| JP | 2001-512390 | | 8/2001 |
| JP | 2001-253208 | | 9/2001 |
| JP | 2002-506403 | | 2/2002 |
| JP | 2005-82017 | * | 3/2005 |
| WO | WO 2005/025895 | * | 3/2005 |

* cited by examiner

PNEUMATIC RADIAL TIRE

TECHNICAL FIELD

The present invention relates to a pneumatic radial tire. Specifically, the present invention relates to a pneumatic radial tire in which a main belt layer formed of steel cords and a circumferential-direction reinforcement layer formed of steel cords are disposed in the tread, and which has an improved fatigue resistance of the circumferential-direction reinforcement layer while the reinforcing effect of the circumferential-direction reinforcement layer to the main belt layer is secured.

BACKGROUND ART

In recent years, as to pneumatic radial tires for use in trucks and buses, it has been argued that dual tires be replaced with a single tire for the purpose of weight reduction and resource saving. The tread width of a single tire to be used instead of dual tires is increased while the outside diameter thereof is not changed, so that the aspect ratio of the tire is small. Accordingly, such a single tire is a so-called low-profile pneumatic radial tire. In addition, the inflation pressure is set higher than that of dual tires for obtaining the capability of the dual tires with the single tire.

In the case of a heavy-duty pneumatic radial tire having a wide tread width and a low aspect ratio as described above, the load on the belt layer in the tread portion at the time of running is significantly increased. This leads to a problem that the durability of the belt layer is reduced. For the purpose of reinforcing such a belt layer with a reduced durability, a number of measures as described below have conventionally been proposed. In such measures, a circumferential-direction reinforcement layer is formed by winding steel cords on a belt layer substantially in parallel to the tire circumferential direction. Then the circumferential-direction reinforcement layer is provided on a belt layer, so that the tread portion is provided with the rigidity in the circumferential direction (For example, Patent Documents 1 and 2).

However, steel cords have a high elastic modulus, and are thus vulnerable to compression. For this reason, when the steel cords are oriented in the tire circumferential direction as in the above-described circumferential-direction reinforcement layer, the steel cords are repetitively deformed when the tire is rolling so as to be likely to rupture due to fatigue. In particular, there has been a problem that fatigue rupture is likely to occur in steel cords in the edge portions of the circumferential-direction reinforcement layer to thus reduce the durability of the tire.

The inventor has made various studies on the reason why failure is likely to occur in the edge portions of the circumferential-direction reinforcement layer as described above. The inventor has thus found out the following reason. Specifically, the circumferential-direction reinforcement layer is subjected not only to a repetitive tensile strain when the tire is rolling. When in-plane bending of the belt layer occurs at the time of traveling corners, one of both edge portions is subjected to a tensile strain while the other one of both edge portions is subjected to a compressive strain. A series of such phenomena make failure likely to occur in the edge portions of the circumferential-direction reinforcing layer. On the basis of the finding, the inventor has eventually made the present invention.

Patent Document 1: Japanese Translation of PCT International Application No. 2001-522748
Patent Document 2: Japanese Translation of PCT International Application No. 2001-522748

DISCLOSURE OF THE INVENTION

An object of the present invention is to provide a pneumatic radial tire, in which a main belt layer formed of steel cords and a circumferential-direction reinforcement layer formed of steel cords are disposed in the tread, and which has an improved fatigue resistance of the circumferential-direction reinforcement layer while the reinforcing effect of the circumferential-direction reinforcement layer to the main belt layer is secured.

Another object of the present invention is to provide a pneumatic radial tire, in which a main belt layer formed of steel cords and a circumferential-direction reinforcement layer formed of steel cords are disposed in the tread, and in which separation failure is prevented from occurring in the edge portions of the main belt layer, and also from occurring between the main belt layer and the circumferential-direction reinforcement layer.

A pneumatic radial tire of the present invention for achieving the objects includes a main belt layer and at least one circumferential-direction reinforcement layer, which are provided in the tread portion. The main belt layer includes two belt layers in each of which steel cords are disposed in a manner that the steel cords of a first one of the two belt layers intersect the steel cords of a second one of the two belt layers. In the circumferential-direction reinforcement layer, steel cords are disposed in a substantial tire circumferential direction. The pneumatic radial tire has the following characteristics. The ratio Wo/Wm of the width Wo of the circumferential-direction reinforcement layer to the maximum width Wm of the main belt layer is 0.5 to 0.9. Concurrently, the ratio Ee/Ec of the reinforcement-cord elastic modulus Ee of the steel cords in the edge portions of the circumferential-direction reinforcement layer to the reinforcement-cord elastic modulus Ec of the steel cords in the center portion of the circumferential-direction reinforcement layer is not less than (0.85–0.5 Wo/Wm) and not more than 0.8.

It is more preferable that the pneumatic radial tire of the present invention be configured as follows. Firstly, A rate of change in the outer peripheral length of the tread portion on the equator between a time when the tire is inflated with an air pressure of 100 kPa and a time when the tire is inflated with a regulated air pressure corresponding to the maximum load capacity is defined as an outer-peripheral-length change rage Rc, and a rate of change in the outer peripheral length of the tread portion on the shoulder portions between these times is defined as another outer-peripheral-length change rate Rs. Then, the ratio Rc/Rs may satisfy a range from 0.7 to 1.3 when the pneumatic radial tire is mounted on a standard rim defined by The Japan Automobile Tire Manufacturers Association (hereinafter, abbreviated as "JATMA").

According to the present invention, the width Wo of the circumferential-direction reinforcement layer in which steel cords are oriented in a substantial tire circumferential direction is restricted so as to have a certain relationship in size with the maximum width Wm of the main belt layer. At the same time, the reinforcement-cord elastic modulus Ee of the steel cords in the edge portions is set lower to a certain extent than the reinforcement-cord elastic modulus Ec of the steel cords in the center portion. Accordingly, it is possible to ease compressive strain in the edge portions while securing the reinforcing function of the circumferential-direction reinforcement layer as a tension member to the main belt layer. As a result, it is possible to improve the resistance of the circumferential-direction reinforcement layer against fatigue rupture.

BEST MODES FOR CARRYING OUT THE INVENTION

In the present invention, a pneumatic radial tire includes a main belt layer and a circumferential-direction reinforcement layer disposed in the tread portion. The main belt layer includes two belt layers. In each of the two belt layers, steel cords are disposed obliquely with respect to the tire circumferential direction in a manner that the steel cords of a first one of the two belt layers intersect the steel cords of a second one of the two belt layers. The circumferential-direction reinforcement layer is formed by winding steel cords in a manner that the steel cords are oriented in a substantial tire circumferential direction. The present invention is preferably applied particularly to heavy-duty pneumatic radial tires as follows. Specifically, the tread portion of the tire has a wide width as if dual tires are replaced with a single tire. In addition, the tire maximum width at the time when the tire is inflated with an air pressure corresponding to the maximum load capacity, which pressure is regulated by JATMA, is 350 mm or more. Moreover, the aspect ratio of the tire is 60% or less.

The main belt layer in the present invention includes the pair of two belt layers each including a width enough to reinforce the tread portion entirely in the width direction thereof. Concurrently, the alignment direction of the steel cords in one of the belt layers and the alignment direction of the steel cords in the other one of the belt layers are inclined respectively to the sides opposite to each other, with respect to the tire circumferential direction. It is preferable that the inclination angle θ or θ of the steel cords of each of the two belt layers with respect to the tire circumferential direction be 15° to 40° at a position in the equator. The inclination angles θ and θ of the steel cords of the two belt layers may be the same, or may be different from each other. Moreover, it is also possible to additionally dispose, for the main belt layer, an auxiliary belt layer formed of steel cords of another type, and having a width narrower than that of the main belt layer.

The circumferential-direction reinforcement layer is formed by winding a plurality of steel cords in a manner that the steel cords are oriented substantially in the tire circumferential direction. It is preferable to form the circumferential-direction reinforcement layer by spirally winding, substantially in the tire circumferential direction, a tape composed of one to five steel cords aligned and rubberized with an unvulcanized rubber. However, the circumferential-direction reinforcement layer may also be formed in the following manner. Specifically, a band-shaped material is prepared by aligning a plurality of steel cords having a certain width together with a circumferential-direction reinforcement layer, and then the prepared band-shaped material is rubberized with an unvulcanized rubber. Then, the resultant band-shaped material is wound substantially in the tire circumferential direction one round, and the two end portions of the band-shaped member are spliced to each other. Here, the "substantially in the tire circumferential direction" means a direction inclined with respect to the tire circumferential direction at a range from 0° to 10°.

The circumferential-direction reinforcement layer is disposed adjacent to the main belt layer including the pair of two belt layers in the tread portion. For the position of the disposition, it is most preferable that the circumferential-direction reinforcement layer be wound on the outermost periphery of the main belt layer. Alternatively, the circumferential-direction reinforcement layer may be disposed between the two belt layers of the main belt layer, or may be disposed on the innermost periphery of the main belt layer. The position where the circumferential-direction reinforcement layer is disposed is not limited to only one position, but the circumferential-direction reinforcement layers may be disposed two or more of the above-described three positions.

The circumferential-direction reinforcement layer is provided to have a certain ratio of the width Wo (arc width), in the tire width direction, of the circumferential-direction reinforcement layer to the maximum width Wm (arc width) of the main belt layer. The ratio Wo/Wm of the width Wo of the circumferential-direction reinforcement layer to the maximum width Wm of the main belt layer is required to be in a range from 0.5 to 0.9.

The circumferential-direction reinforcement layer is configured in a manner that the reinforcement-cord elastic modulus of the steel cords varies in the tire width direction. Specifically, the reinforcement-cord elastic modulus Ee in the edge portions is made smaller than the reinforcement-cord elastic modulus Ec in the center portion at a certain ratio. It is necessary that the ratio Ee/Ec of the reinforcement-cord elastic modulus Ee in the edge portions to the reinforcement-cord elastic modulus Ec in the center portion be not less than (0.85−0.5 Wo/Wm) and not more than 0.8. When the reinforcement-cord elastic modulus of the steel cords is caused to vary in the circumferential-direction reinforcement layer in the tire width direction, it is preferable that the reinforcement-cord elastic modulus is gradually reduced, so that the reinforcement-cord elastic modulus in the center portion is larger than that in each of the edge portions.

It is preferable that the reinforcement-cord elastic modulus Ec of the steel cords in the center portion of the circumferential-direction reinforcement layer be in a range from 20 GPa to 125 GPa. In addition, it is preferable that the cord structure of the steel cords be an m×n structure in which the twisting directions of the steel cords of the first twist and the second twist be the same direction.

In the pneumatic radial tire of the present invention, the width of the circumferential-direction reinforcement layer and the reinforcement-cord elastic modulus Ee of the steel cords in the edge portions are set as described above. Accordingly, the circumferential-direction reinforcement layer produces the reinforcing effect as a tension member to the main belt layer. Concurrently, the compressive strain in the edge portions is eased. As a result, it is possible to improve the resistance of the circumferential-direction reinforcement layer against fatigue rupture.

When the width Wo of the circumferential-direction reinforcement layer is less than 0.5 times the maximum width Wm of the main belt layer, the reinforcing effect to the main belt layer is reduced. For this reason, it is difficult to suppress a phenomenon in which the edge portions of the main belt layer surge due to the centrifugal force at the time of high-speed traveling. On the other hand, when the width Wo of the circumferential-direction reinforcement layer is more than 0.9 times the maximum width Wm of the main belt layer, in-plane bending of the belt layers occurs at the time of traveling corners. Accordingly, the steel cords in the edge portions of the circumferential-direction reinforcement layer are likely to buckle in the compression direction.

When the reinforcement-cord elastic modulus Ee of the steel cords in the edge portions of the circumferential-direction reinforcement layer is less than (0.85–0.5 Wo/Wm), the effect of suppressing the surging of the edge portions of the main belt layer is reduced. For this reason, the reinforcing effect to the main belt layer is insufficient. On the other hand, the reinforcement-cord elastic modulus Ee is larger than 0.8, the steel cords are likely to buckle in the compression direction due to in-plane bending at the time of traveling corners.

For obtaining the variation in the reinforcement-cord elastic modulus of the circumferential-direction reinforcement layer in the tire width direction, steel cords having different elastic moduli from each other may be disposed respectively in the center portion and in the edge portions. When the same steel cords are used entirely in the width direction, the winding tension for the steel cords may be adjusted, so that the steel cords are wound with a large tension in the center portion while being wound with a small tension in the edge portions. Alternatively, when the same steel cords are used entirely in the width direction, the lifting rate (expansion rate in diameter) may be adjusted so as to be large in the center portion while to be small in the edge portions.

It should be noted that the reinforcement-cord elastic modulus in the present invention is a characteristic value measured in the following manner.

A pneumatic radial tire is disassembled. Then, a tensile test is performed on steel cords covered with rubber, which are removed from the circumferential-direction reinforcement layer under the following conditions: the testing length of 250 mm; a tensile speed of 5 mm/min in accordance with the regulation of JIS G3510. Then, the reinforcement-cord elastic modulus may be obtained by the following equation (1):

$$E = 0.2 \times (L_{1.0} - L_{0.5})/S_{SC} \tag{1}$$

where

E is the reinforcement-cord elastic modulus (GPa),
$L_{0.5}$ is a tension at the time of 0.5% extension,
$L_{1.0}$ is a tension at the time of 1.0% extension, and
$S_{SC}$ is the cross-sectional area of the steel cords (the total of the cross-sectional areas of wires).

The reinforcement-cord elastic modulus Ee of the steel cords in the edge portions is the average of reinforcement-cord elastic moduli obtained by measuring the respective steel cords disposed in a portion in each of the edge portions of the circumferential-direction reinforcement layer. Here, the portion extends from the corresponding edge towards the center, and has a width of 5% of the width of the circumferential-direction reinforcement layer. On the other hand, the reinforcement-cord elastic modulus Ec of the steel cords in the center portion is the average of reinforcement-cord elastic moduli obtained by measuring the respective steel cords disposed in the center portion of the circumferential-direction reinforcement layer when the equator is taken as the center. Here the center portion has a width of 5% of the width of the circumferential-direction reinforcement layer.

In the pneumatic radial tire of the present invention with the circumferential-direction reinforcement layer configured as described above, it is possible to set the ratio Rc/Rs of the outer-peripheral-length change rate Rc to the outer-peripheral-length change rate Rs within a range from 0.7 to 1.3. Here, the outer-peripheral-length change rate Rc is a rate of change in the outer peripheral length of the tread portion on the equator between a time when the tire is inflated with an air pressure of 100 kPa and a time when the tire is inflated with a regulated air pressure corresponding to the maximum load capacity. The outer-peripheral-length change rate Rs is a rate of change in the outer peripheral length of the tread portion on the shoulder portions between those times. Incidentally, at this time, the tire is mounted on the standard rim defined by JATMA. When the ratio Rc/Rs cannot be set in this range only with the above-described configuration of the circumferential-direction reinforcement layer, the setting can be obtained by adjusting the shape of a wedge-shaped cross-sectional rubber layer to be inserted into a carcass layer in the edge portion of the belt layers, the cross-sectional shape of each side tread, the layout of the carcass layer, or the like.

When the ratio Rc/Rs of the outer-peripheral-length change rate Rc of the tread portion on the equator to the outer-peripheral-length change rate Rs thereof on the shoulder portions is less than 0.7, the deformation in the shoulder portions is large. As a result, the edge portions of the main belt layer are likely to be separated, and fatigue rupture is likely to occur in the steel cords in the edge portions of the circumferential-direction reinforcement layer. On the other hand, when the ratio Rc/Rs is larger than 1.3, the deformation of the center portion is large. As a result, separation is likely to occur between the main belt layer and the circumferential-direction reinforcement layer.

In a heavy-duty pneumatic radial tire, the contour of the tread portion at the time when the tire is inflated with an air pressure of 100 kPa is the same as the contour of the tread forming surface of a mold. Accordingly, when the ratio Rc/Rs of the outer-peripheral-length change rate Rc of the tread portion on the equator to the outer-peripheral-length change rate Rs thereof on the shoulder portions is within the above-described range, the following can be said. When the tire is inflated with a regulated maximum air pressure allowed for the tire, the contour of the tread portion is deformed at a substantially uniform rate over the tread width from the equator to each of the shoulder portions, with respect to the contour of the tread forming surface of the mold. For this reason, it is possible to drastically improve the durability of the tire. In particular, it is also possible to obtain a significant effect even in the case of a pneumatic radial tire with a wide width and a low aspect ratio, having a tire maximum width of not less than 350 mm and an aspect ratio of not more than 60%.

Here, the "equator," used for measuring the outer-peripheral-length change rate Rc is the center line by which the tread portion is divided into two equal parts in the tire width direction. On the other hand, the "shoulder portion," used for measuring the outer-peripheral-length change rate Rs is a position located 35% of the tire total length apart from the equator. However, when a tire-circumferential-direction main groove is provided in each of the "equator" and the "shoulder portion," the "equator" and the "shoulder" portion are defined as follows. Specifically, the position of the "equator" is set at a position on a land portion immediately adjacent to the corresponding tire-circumferential-direction main groove, while the position of the "shoulder portion" is set at a position on a land portion immediately adjacent to, and displaced outward in the width direction from, the corresponding tire-circumferential-direction main groove.

In addition, the outer-peripheral-length change rates Rc and Rs are calculated respectively with the following equations (2) and (3):

$$Rc = (Cc' - Cc)/Cc \tag{2}$$

$$Rs = (Cs' - Cs)/Cs \tag{3}$$

where

Cc is the outer peripheral length on the equator at the time when the tire is inflated with an air pressure of 200 kPa, Cc' is the outer peripheral length on the equator at the time when the tire is inflated with an air pressure corresponding to the maximum load capacity, Cs is the outer peripheral length on the shoulder portions at the time when the tire is inflated with an air pressure of 200 kPa, and Cs' is the outer peripheral length of the shoulder portions at the time when the tire is inflated with an air pressure corresponding to the maximum load capacity.

Each of the outer peripheral lengths Cs and Cs' used in the equation is the average of values measured respectively on the left and right shoulder portions.

Figure 1:
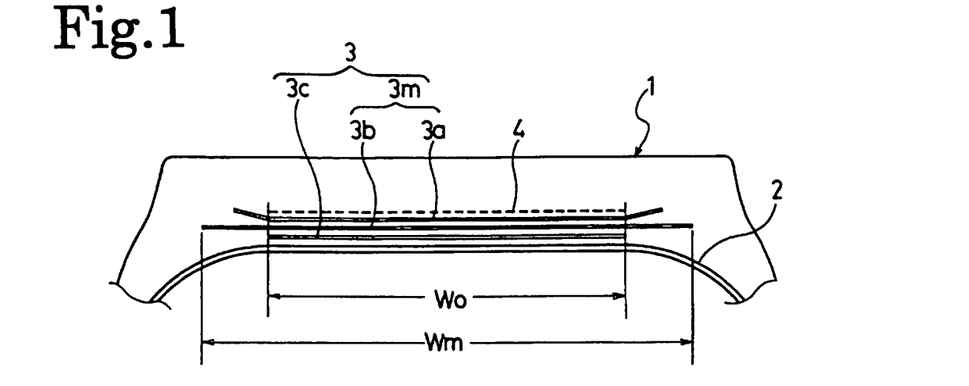
FIG. 1 is a meridional sectional view showing only the tread portion of a heavy-duty pneumatic radial tire according to an embodiment of the present invention.
Figure 2:
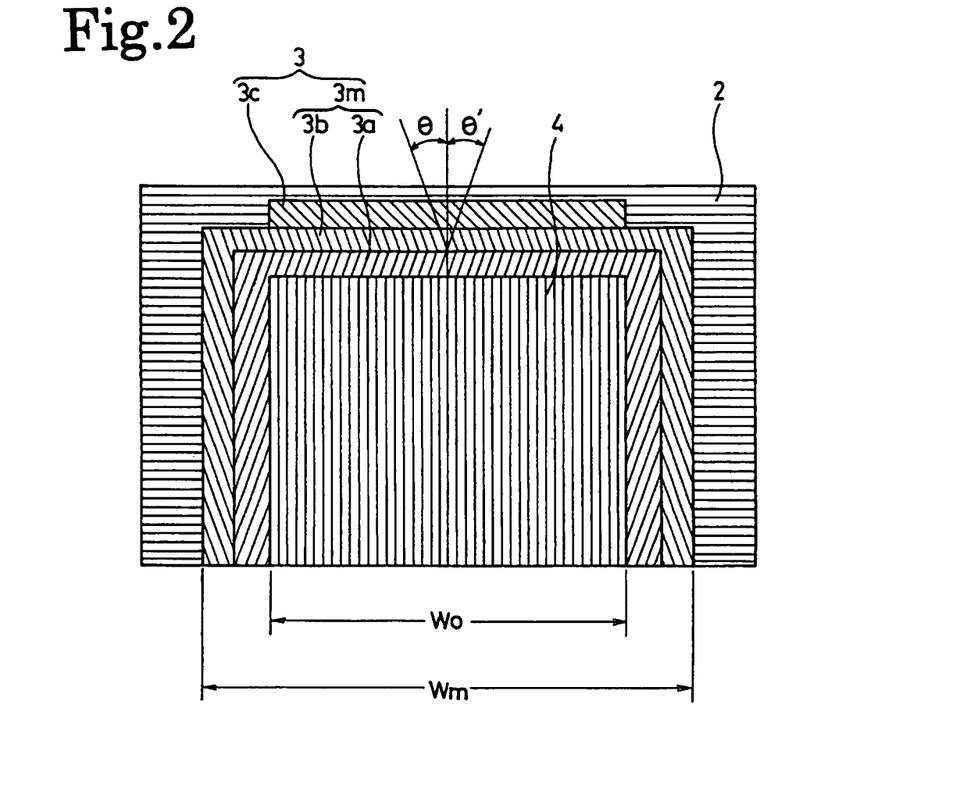
FIG. 2 is an expanded view showing belt layers, a circumferential-direction reinforcement layers and the like in the tire shown in FIG. 1.

FIG. 1 is a meridional sectional view exemplifying only the tread portion of the heavy-duty pneumatic radial tire according to an embodiment of the present invention. FIG. 2 is an expanded view showing belt layers, a circumferential-direction reinforcement layer and the like, which are inserted into the tread portion shown in FIG. 1.

Reference numeral 1 denotes the tread portion while reference numeral 2 denotes a carcass layer. In the carcass layer 2, carcass cords are oriented in a direction inclined at substantially 90° with respect to the tire circumferential direction. Each of the carcass cords may be any one of a steel cord and an organic fiber cord.

A plurality of belt layers 3 each formed of steel cords are provided on the outer periphery side of the carcass layer 2. In addition, a circumferential-direction reinforcement layer 4 is provided on the outer side of the belt layers 3. The circumferential-direction reinforcement layer 4 is formed by winding steel cords in a manner that the steel cords are oriented in a direction inclined at substantially 0° to 10° with respect to the substantial tire circumferential direction. The belt layers 3 is constituted of a main belt layer 3m and an auxiliary belt layer 3c as an auxiliary member. The main belt layer includes two belt layers 3a and 3b each having a wide width while the auxiliary belt layer 3c has a width narrower than that of the main belt layer 3m. The steel cords constituting the belt layers 3a and the steel cords constituting the belt layer 3b are inclined respectively at inclination angles θ and θ' with respect to the tire circumferential direction, and concurrently are inclined to the sides opposite to each other. Moreover, the steel cords of the auxiliary belt layer 3c are inclined at an angle larger than the inclination angles θ and θ' of the respective belt layers 3a and 3b of the main belt layer 3m.

In the pneumatic radial tire of the present invention, which is configured as described above, the ratio Wo/Wm of the width Wo (arc width) of the circumferential-direction reinforcement layer 4 to the maximum width Wm of the main belt layer 3m is set at 0.5 to 0.9. In addition, the circumferential-direction reinforcement layer is configured, so that the ratio Ee/Ec of the reinforcement-cord elastic modulus Ee of the steel cords in the edge portions to the reinforcement-cord elastic modulus Ec of the steel cords in the center portion is not less than (0.85−0.5 Wo/Wm) and not more than 0.8. It is preferable that the reinforcement-cord elastic modulus is gradually reduced, so that the reinforcement-cord elastic modulus in the center portion is larger than that in each of the edge portions.

In the pneumatic radial tire with the width ratio Wo/Wm and the ratio Ee/Ec of the reinforcement-cord elastic moduli of the circumferential-direction reinforcement layer, which are set as described above, it is possible to set the ratio Rc/Rs of the outer-peripheral-length change rate Rc to the outer-peripheral-length change rate Rs within a range from 0.7 to 1.3. Here, the outer-peripheral-length change rate Rc is a rate of change in the outer peripheral length of the tread portion on the equator between a time when the tire is inflated with an air pressure of 100 kPa and a time when the tire is inflated with a regulated air pressure corresponding to the maximum load capacity. The outer-peripheral-length change rate Rs is a rate of change in the outer peripheral length of the tread portion on the shoulder portions between those times. Incidentally, at this time, the tire is mounted on the standard rim defined by JATMA.

In the pneumatic radial tire of the present invention, the circumferential-direction reinforcement layer of the above-described configuration produces, as a tension member, the reinforcing effect to the main belt layer, and concurrently produces an effect of easing the compressive strain in the edge portions. Accordingly, even in the case of a pneumatic radial tire with a wide width and a low aspect ratio, it is possible to improve the resistance of the circumferential-direction reinforcement layer against fatigue rupture. In addition, it is possible to prevent a separation in the edge portions of the main belt layer as well as a separation between the main belt layer and the circumferential-direction auxiliary layer from occurring. As a result, it is possible to obtain a pneumatic radial tire having a high durability even when the tire has a wide width and a low aspect ratio.

Examples 1 to 3, Conventional Example, and Comparative Examples 1 to 3

Seven types of heavy-duty pneumatic radial tires (Conventional Example, Examples 1 to 3, and Comparative Examples 1 to 3) were prepared under the same conditions that each tire had a tire size of 495/45R22.5 and the tire structure shown in FIG. 1, that the cord structure of steel cords used in the circumferential-direction reinforcement layer of each tire was 3×(1×0.34+6×0.30)HE, that the cross-sectional area of each cord was 1.54 mm$^2$, and that the cord end count was 21 cords/50 mm. On the other hand, these tires were made different from one another as described in Table 1 in the following factors: the reinforcement-cord elastic modulus Ec of the steel cords in the center portion of the circumferential-direction reinforcement layer; the reinforcement-cord elastic modulus Ee of the steel cords in the edge portions thereof; the ratio Wo/Wm of the width Wo of the circumferential-direction reinforcement layer to the maximum width Wm of the main belt layer; and the ratio Rc/Rs of the outer-peripheral-length change rate Rc of the tread portion on the equator to the outer-peripheral-length change rate Rs thereof on the shoulder portions.

The durability of each of these seven types of the heavy-duty pneumatic radial tires was measured by the following measuring method. Accordingly, the results shown in Table 1 were obtained.

(Durability Test)

Each of the test tires was mounted on a rim having a rim size of 22.5×17.00 with an internal pressure of 900 kPa. Then, the tire mounted on the rim was caused to undergo a preliminary running at a rotating speed of 60 km/hr, with a load of 88% of the maximum load defined by JATMA, for 60 minutes, by using a drum testing machine having a smooth drum surface made of steel and a diameter of 1707 mm while the ambient temperature was controlled at 38±3° C. After the completion of the preliminary running, a main running was started with the tire at the same speed as that of the primarily running, while a slip angle with an oscillating range of ±4° was applied to the tire with a sine wave of 0.05 Hz. The load condition was set at 120% of the maximum load defined by JATMA, and the test was continued until the tire was broken.

The evaluations are indicated by indices where the total running distance until the breakage of the tire of Conventional Example is taken as 100. The larger the index is, the more excellent the durability is.

In terms of types of breakage, in the tires of Examples 1 to 3, only the falling out of cords of the side portions was observed. On the other hand, in the tires of Conventional Example and Comparative Example 2, both of separation of the edge portions of the main belt layer and rupture of the circumferential-direction reinforcement layer occurred. In the tires of Conventional Examples 1 and 2, separation of the edge portions of the main belt layer occurred.

[Table 1]

the reinforcement-cord elastic modulus Ee of the steel cords in the edge portions thereof; the ratio Wo/Wm of the width Wo of the circumferential-direction reinforcement layer to the maximum width Wm of the main belt layer; and the ratio Rc/Rs of the outer-peripheral-length change rate Rc of the tread portion on the equator to the outer-peripheral-length change rate Rs thereof on the shoulder portions. Each of these tires of Comparative Examples 4 to 9 has a width ratio Wo/Wm above the upper limit or below the lower limit.

The durability of each of these six types of the heavy-duty pneumatic radial tires was measured in the same manner as that of Examples described above. Accordingly, the results shown in Table 2 were obtained.

TABLE 1

|  | Conventional Example | Example 1 | Example 2 | Comparative Example 1 | Comparative Example 2 | Example 3 | Comparative Example 3 |
|---|---|---|---|---|---|---|---|
| Reinforcement-cord Elastic Moduli of Circumferential-direction Reinforcing Layer | | | | | | | |
| Center Portion Ec (GPa) | 60 | 60 | 60 | 60 | 60 | 60 | 60 |
| Edge Portions Ee (GPa) | 60 | 45 | 27 | 24 | 60 | 45 | 30 |
| Ratio Ee/Ec | 1.00 | 0.75 | 0.45 | 0.40 | 1.00 | 0.75 | 0.50 |
| Width of Circumferential-direction Reinforcement Layer | | | | | | | |
| Ratio Wo/Wm to Width of Main Belt Layer 0.85-0.5 Wo/Wm | 0.85 | 0.85 | 0.85 | 0.85 | 0.55 | 0.55 | 0.55 |
| Outer-peripheral-length Change Rate of Tread Portion | 0.425 | 0.425 | 0.425 | 0.425 | 0.575 | 0.575 | 0.575 |
| Equator/Shoulder Portions Ratio Rc/Rs | 1.45 | 1.10 | 0.75 | 0.55 | 1.10 | 0.95 | 0.50 |
| Durability (Index) | 100 | 159 | 139 | 83 | 94 | 123 | 60 |

Comparative Examples 4 to 9

Six types of heavy-duty pneumatic radial tires (Comparative Examples 4 to 9) were prepared under the same conditions as those of Example 1, which include the tire size, the tire structure, the cord structure of steel cords in the circumferential-direction reinforcement layer. Concurrently, these tires of Comparative Examples 4 to 9 were made different as described in Table 2, in the following factors: the reinforcement-cord elastic modulus Ec of the steel cords in the center portion of the circumferential-direction reinforcement layer;

In terms of types of breakage, in the tires of Comparative Example 4 to 6, each of which has a width of the circumferential-direction reinforcement layer narrower than the regulation of the present invention, separation of the edge portions of the main belt layer occurred. On the other hand, in the tires of Comparative Examples 7 to 9, each of which has a width of the circumferential-direction reinforcement layer narrower than the regulation of the present invention, rupture of the circumferential-direction reinforcement layer occurred.

TABLE 2

|  | Comparative Example 4 | Comparative Example 5 | Comparative Example 6 | Comparative Example 7 | Comparative Example 8 | Comparative Example 9 |
|---|---|---|---|---|---|---|
| Reinforcement-cord Elastic Moduli of Circumferential-direction Reinforcing Layer | | | | | | |
| Center Portion Ec (GPa) | 60 | 60 | 60 | 60 | 60 | 60 |
| Edge Portions Ee (GPa) | 60 | 55 | 45 | 60 | 40 | 20 |
| Ratio Ee/Ec | 1.00 | 0.92 | 0.75 | 1.00 | 0.67 | 0.33 |
| Width of Circumferential-direction Reinforcement Layer | | | | | | |
| Ratio Wo/Wm to Width of Main Belt Layer 0.85-0.5 Wo/Wm | 0.45 | 0.45 | 0.45 | 0.95 | 0.95 | 0.95 |
| Outer-peripheral-length Change Rate of Tread Portion | 0.625 | 0.625 | 0.625 | 0.375 | 0.375 | 0.375 |
| Equator/Shoulder Portions Ratio Rc/Rs | 1.00 | 0.88 | 0.75 | 1.55 | 1.25 | 1.10 |
| Durability (Index) | 78 | 63 | 58 | 30 | 36 | 40 |

Examples 4 to 8

Five types of heavy-duty pneumatic radial tires (Examples 4 to 8) were prepared under the same conditions as those of Example 1, which include the tire size, the tire structure, the cord structure of steel cords in the circumferential-direction reinforcement layer, the reinforcement-cord elastic modulus Ec of the steel cords in the center portion of the circumferential-direction reinforcement layer, the reinforcement-cord elastic modulus Ee of the steel cords in the edge portions thereof. Concurrently, these tires of Examples 4 to 8 were made different as described in Table 3, in the following factors: the ratio Wo/Wm of the width Wo of the circumferential-direction reinforcement layer to the maximum width Wm of the main belt layer; and the ratio Rc/Rs of the outer-peripheral-length change rate Rc of the tread portion on the equator to the outer-peripheral-length change rate Rs thereof on the shoulder portions.

The durability of each of these five types of the heavy-duty pneumatic radial tires was measured in the same manner as that of Examples described above. Accordingly, the results shown in Table 3 were obtained.

As is clear from the results shown in Table 3, when the ratio Rc/Rs of the outer-peripheral-length change rate Rc of the tread portion on the equator to the outer-peripheral-length change rate Rs thereof on the shoulder portions is too small or too large, the durability of the tire is relatively reduced.

In addition, heavy-duty pneumatic radial tires (Examples 12 and 13) were prepared. The heavy-duty pneumatic radial tires of Examples 12 and 13 had the same tire size and the same tire structure as those of Example 1, and the same ratio Wo/Wm of the width Wo of the circumferential-direction reinforcement layer to the maximum width Wm of the main belt layer as that of Examples 9 to 11. In the tire of Example 12, the cord structure of steel cords in the circumferential-direction reinforcement layer was 3+9×0.35 (the cross-sectional area of each cord: 1.154 mm$^2$), and each cord was formed to have a spiral wave. Moreover, the tire of Example 12 was made different as described in Table 4 in the following factors: the reinforcement-cord elastic modulus Ec in the center portion; the reinforcement-cord elastic modulus Ee in the edge portions; and the ratio Rc/Rs of the outer-peripheral-length change rate Rc of the tread portion on the equator to the outer-peripheral-length change rate Rs thereof on the shoulder portions. On the other hand, in the tire of Example 13, the cord structure of steel cords in the circumferential-direction reinforcement layer was 1×6×0.40 (the cross-sectional area of each cord: 0.754 mm$^2$). Moreover, the tire of Example 13 was made different as described in Table 4 in the following factors: the reinforcement-cord elastic modulus Ec in the center portion; the reinforcement-cord elastic modulus Ee in

TABLE 3

| | Example 4 | Example 5 | Example 6 | Example 7 | Example 8 |
|---|---|---|---|---|---|
| Reinforcement-cord Elastic Moduli of Circumferential-direction Reinforcing Layer | | | | | |
| Center Portion Ec (GPa) | 60 | 60 | 60 | 60 | 60 |
| Edge Portions Ee (GPa) | 45 | 45 | 45 | 45 | 45 |
| Ratio Ee/Ec | 0.75 | 0.75 | 0.75 | 0.75 | 0.75 |
| Width of Circumferential-direction Reinforcement Layer | | | | | |
| Ratio Wo/Wm to Width of Main Belt Layer | 0.75 | 0.75 | 0.75 | 0.75 | 0.75 |
| 0.85-0.5 Wo/Wm | 0.475 | 0.475 | 0.475 | 0.475 | 0.475 |
| Outer-peripheral-length Change Rate of Tread Portion | | | | | |
| Equator/Shoulder Portions Ratio Rc/Rs | 0.6 | 0.8 | 1.0 | 1.2 | 1.4 |
| Durability (Index) | 104 | 122 | 151 | 114 | 108 |

Examples 9 to 13

Three types of heavy-duty pneumatic radial tires (Examples 9 to 11) were prepared under the same conditions as those of Example 1, which include the tire size, the tire structure, the cord structure of steel cords in the circumferential-direction reinforcement layer, the reinforcement-cord elastic modulus Ec of the steel cords in the center portion of the circumferential-direction reinforcement layer, the reinforcement-cord elastic modulus Ee of the steel cords in the edge portions thereof. Concurrently, these tires of Examples 9 to 11 were made different as described in Table 4, in the following factors: the ratio Wo/Wm of the width Wo of the circumferential-direction reinforcement layer to the maximum width Wm of the main belt layer; and the ratio Rc/Rs of the outer-peripheral-length change rate Rc of the tread portion on the equator to the outer-peripheral-length change rate Rs thereof on the shoulder portions.

the edge portions; and the ratio Rc/Rs of the outer-peripheral-length change rate Rc of the tread portion on the equator to the outer-peripheral-length change rate Rs thereof on the shoulder portions.

The durability of each of these three types of the pneumatic radial tires was measured in the same manner as that of Examples described above. Accordingly, the results shown in Table 4 were obtained.

As is clear from the results shown in Table 4, when the reinforcement-cord elastic modulus of steel cords of the circumferential-direction reinforcement layer is too small, separation of the edge portions of the main belt layer occurs. On the other hand, the reinforcement-cord elastic modulus of the steel cords of the circumferential-direction reinforcement layer is too large, both of separation of the edge portions of the main belt layer and rupture of the circumferential-direction reinforcement layer occur.

TABLE 4

|  | Example 9 | Example 10 | Example 11 | Example 12 | Example 13 |
|---|---|---|---|---|---|
| Reinforcement-cord Elastic Moduli of Circumferential-direction Reinforcing Layer | | | | | |
| Center Portion Ec (GPa) | 60 | 28 | 100 | 8 | 130 |
| Edge Portions Ee (GPa) | 45 | 21 | 75 | 6 | 98 |
| Ratio Ee/Ec | 0.75 | 0.75 | 0.75 | 0.75 | 0.75 |
| Width of Circumferential-direction Reinforcement Layer | | | | | |
| Ratio Wo/Wm to Width of Main Belt Layer | 0.75 | 0.75 | 0.75 | 0.75 | 0.75 |
| 0.85-0.5 Wo/Wm | 0.475 | 0.475 | 0.475 | 0.475 | 0.475 |
| Outer-peripheral-length Change Rate of Tread Portion | | | | | |
| Equator/Shoulder Portions Ratio Rc/Rs | 1.00 | 0.95 | 1.05 | 0.90 | 1.10 |
| Durability (Index) | 151 | 122 | 157 | 105 | 102 |

What is claimed is:

1. A heavy-duty pneumatic radial tire comprising:
a main belt layer provided in the tread portion, and including two belt layers in which steel cords of the two belt layers intersect each other, wherein outer peripheral end portions in a tire width-wise direction of a radially outermost of the two belt layers are inclined toward an outer peripheral edge of the tire, and outer peripheral end portions in a tire width-wise direction of a radially innermost of the two belt layers are flat; and
at least one circumferential-direction reinforcement layer provided in the tread portion, the reinforcement layer being formed from a single layer of steel cords disposed substantially in a tire circumferential direction, wherein each of the steel cords is unbent in a tire axial direction, and wherein
the ratio Wo/Wm of the width Wo of the circumferential-direction reinforcement layer to the maximum width Wm of the main belt layer is 0.5 to 0.9, and
the ratio Ee/Ec of the reinforcement-cord elastic modulus Ee of the steel cords in the edge portions of the circumferential-direction reinforcement layer to the reinforcement-cord elastic modulus Ec of the steel cords in the center portion of the circumferential-direction reinforcement layer is not less than (0.85−0.5 Wo/Wm) and not more than 0.8,
wherein the tire has a maximum width of not less than 350 mm and an aspect ratio of not more than 60% when the tire is inflated with an air pressure corresponding to the maximum load capacity defined by JATMA, such that the tire is used in place of conventional dual tires, and
wherein a single auxiliary belt layer which is formed of steel cords and narrower than the main belt layer is disposed radially inward of the main belt layer such that the auxiliary belt layer covers at least a portion of the tire including an axially central portion of the tire, and the main belt layer completely covers the auxiliary belt layer, the steel cords of the auxiliary belt layer having an inclination angle greater than inclination angles of the two belt layers forming the main belt layer.

2. The pneumatic radial tire according to claim 1, wherein the ratio Rc/Rs of an outer-peripheral-length change rate Rc on the equator of the tread between a time when the tire mounted on a standard rim defined by JATMA is inflated with an air pressure of 100 kPa and a time when the tire is inflated with a regulated air pressure corresponding to the maximum load capacity to another outer-peripheral-length change rate Rs on the shoulder portions between these times satisfies a range from 0.7 to 1.3.

3. The pneumatic radial tire according to claim 1, wherein the inclination angle of the steel cords of the main belt layer is 15° to 40° with respect to the tire circumferential direction.

4. The pneumatic radial tire according to claim 1, wherein the circumferential-direction reinforcement layer is disposed in any one of a portion on the outermost periphery of the main belt layer, a portion between the two belt layers of the main belt layer, and a portion on the innermost periphery of the main belt layer.

5. The pneumatic radial tire according to claim 1, wherein the circumferential-direction reinforcement layer is formed by a tape composed of one to five steel cords aligned and covered with an unvulcanized rubber, which is wound spirally substantially in a tire circumferential direction.

6. The pneumatic radial tire according to claim 1, wherein the reinforcement-cord elastic modulus Ec of the steel cords in the center portion of the circumferential-direction reinforcement layer is 20 GPa to 125 GPa.

7. The pneumatic radial tire according to claim 1, wherein the reinforcement-cord elastic modulus Ee of the steel cords in the edge portions is the average of reinforcement cord moduli obtained by measuring the respective steel cords disposed in a portion in each of the edge portions of the circumferential direction reinforcement layer, the edge portions extending from the corresponding edge towards the center and having a width of 5% of the width of the circumferential-direction reinforcement layer;
the reinforcement-cord elastic modulus Ec of the steel cords in the center portion is the average of reinforcement-cord elastic moduli obtained by measuring the respective steel cords disposed in the center portion of the circumferential-direction reinforcement layer when the equator is taken as the center, the center portion having a width of 5% of the width of the circumferential-direction reinforcement layer; and
the reinforcement-cord elastic modulus of the steel cords constituting the circumferential-direction reinforcement layer is gradually reduced from the center portion towards the edge portions.

8. The heavy-duty pneumatic radial tire according to claim 1, wherein the ratio Ee/Ec is set by winding the steel cords in the center portion with a large tension, and winding the steel cords in the edge portions with a relatively smaller tension.

9. The heavy-duty pneumatic radial tire according to claim 1, wherein the steel cords of the circumferential-direction reinforcement layer are formed as an m×n structure in which a twisting direction of the steel cords of a first twist and a twisting direction of the steel cords of a second twist are the same.

10. A heavy-duty pneumatic radial tire comprising:
a main belt layer provided in the tread portion, and including two belt layers in which steel cords of the two belt layers intersect each other, wherein outer peripheral end portions in a tire width-wise direction of a radially outermost of the two belt layers are inclined toward an outer peripheral edge of the tire, and outer peripheral end portions in a tire width-wise direction of a radially innermost of the two belt layers are flat; and
at least one circumferential-direction reinforcement layer provided in the tread portion, the reinforcement layer being formed from a single layer of steel cords disposed substantially in a tire circumferential direction, wherein each of the steel cords is unbent in a tire axial direction, and wherein
the ratio Wo/Wm of the width Wo of the circumferential-direction reinforcement layer to the maximum width Wm of the main belt layer is 0.5 to 0.9, and
the ratio Ee/Ec of the reinforcement-cord elastic modulus Ee of the steel cords in the edge portions of the circumferential-direction reinforcement layer to the reinforcement-cord elastic modulus Ec of the steel cords in the center portion of the circumferential-direction reinforcement layer is not less than (0.85−0.5 Wo/Wm) and not more than 0.8,
wherein the tire has a maximum width of not less than 350 mm and an aspect ratio of not more than 60% when the tire is inflated with an air pressure corresponding to the maximum load capacity defined by JATMA, such that the tire is used in place of conventional dual tires,
wherein the circumferential-direction reinforcement layer is disposed in one of a portion between the two belt layers of the main belt layer and a portion on the innermost periphery of the main belt layer, and
wherein a single auxiliary belt layer which is formed of steel cords and narrower than the main belt layer is disposed radially inward of the main belt layer such that the auxiliary belt layer covers at least a portion of the tire including, an axially central portion of the tire, and the main belt layer completely covers the auxiliary belt layer, the steel cords of the auxiliary belt layer having an inclination angle greater than inclination angles of the two belt layers forming the main belt layer.

11. The heavy-duty pneumatic radial tire according to claim 10, wherein the ratio Ee/Ec is set by winding the steel cords in the center portion with a large tension, and winding the steel cords in the edge portions with a relatively smaller tension.

12. The heavy-duty pneumatic radial tire according to claim 10, wherein the steel cords of the circumferential-direction reinforcement layer are formed as an m×n structure in which a twisting direction of the steel cords of a first twist and a twisting direction of the steel cords of a second twist are the same.

* * * * *